US00RE39737E

(19) United States
(12) Reissued Patent
Driggars

(10) Patent Number: US RE39,737 E
(45) Date of Reissued Patent: Jul. 24, 2007

(54) PRINT-RECEPTIVE, PILL-RESISTANT, KNITTED FABRIC

(75) Inventor: Sonny B. Driggars, Advance, NC (US)

(73) Assignee: HBI Branded Apparel Enterprises, LLC, Winston-Salem, NC (US)

(21) Appl. No.: 10/047,876

(22) Filed: Jan. 14, 2002

Related U.S. Patent Documents

Reissue of:
(64) Patent No.: 6,253,582
Issued: Jul. 3, 2001
Appl. No.: 09/256,981
Filed: Feb. 24, 1999

(51) Int. Cl.
*D04B 9/06* (2006.01)
*D04B 1/00* (2006.01)

(52) U.S. Cl. ..... 66/202; 66/196
(58) Field of Classification Search ..... 66/169 R, 66/202, 196, 195
See application file for complete search history.

(56) References Cited

U.S. PATENT DOCUMENTS

| | | | | | |
|---|---|---|---|---|---|
| 3,525,653 | A | * | 8/1970 | Manock | 156/73.2 |
| 4,071,502 | A | | 1/1978 | Sugiyama et al. | 260/75 T |
| 4,733,546 | A | * | 3/1988 | Toda | 66/202 |
| 5,591,516 | A | * | 1/1997 | Jaco et al. | 442/164 |
| 5,817,740 | A | * | 10/1998 | Anderson et al. | 528/295 |
| 6,253,582 | B1 | * | 7/2001 | Driggars | 66/202 |
| 6,439,002 | B1 | * | 8/2002 | Driggars | 66/202 |

FOREIGN PATENT DOCUMENTS

| | | |
|---|---|---|
| DE | 2642350 | 3/1978 |
| FR | 2230794 | 12/1974 |
| GB | 1517832 | 7/1978 |
| JP | 48-61798 | 8/1973 |

OTHER PUBLICATIONS

Pages 13–15 from Knitting Technology, 2nd Edition, by David J. Spencer "A Comprehensive Handbook and Practical Guide to Modern Day Principles and Practices".

* cited by examiner

*Primary Examiner*—John J. Calvert
*Assistant Examiner*—Robert H. Muromoto, Jr.
(74) *Attorney, Agent, or Firm*—Jeffrey R. McFadden, Esq; Womble Carlyle Sandridge & Rice PLLC

(57) ABSTRACT

A print-receptive, pill-resistant, knitted fabric and printed article of apparel. The fabric is knitted from yarn formed from high-tenacity, staple synthetic fiber having a tenacity value of greater than about 4 grams/denier and preferably about 6 grams/denier. The resulting knitted fabric has a pilling resistance value of greater than about 3. In the preferred embodiment, the high-tenacity, staple synthetic fiber is selected from the group consisting of air jet spun polyester; nylon; acrylic; and polypropylene. The use of staple fibers improves the hand, drape and comfort of the knitted fabric. Also, in the preferred embodiment, the knitted fabric is a double-knit fabric having a front side and a back side, the front side being formed from the high-tenacity, staple synthetic fiber and the back side being substantially formed from cellulosic yarns, such as cotton and synthetic cellulosic fibers. This construction improves both comfort and opacity of the knitted fabric while, at the same time, provides a print-receptive face and good print resolution of the article of apparel after multiple home washings.

28 Claims, 3 Drawing Sheets

PRINT-RECEPTIVE, PILL-RESISTANT, KNITTED FABRIC

Matter enclosed in heavy brackets [ ] appears in the original patent but forms no part of this reissue specification; matter printed in italics indicates the additions made by reissue.

BACKGROUND OF THE INVENTION (1) Field of the Invention

The present invention relates generally to circular knitted fabric and, more particularly, to a pill-resistant knitted fabric and article of apparel having a print-receptive face and good print resolution even after multiple home washings.

(2) Description of the Prior Art

The term circular knitting covers those weft knitting machines having needle beds arranged in circular cylinders and/or dials including latch, bearded and occasionally compound needle machinery. Such machines produce a wide variety of fabric structures, garments, hosiery and other articles and a variety of diameters and machine gauges. Such machines have the needles fixed in a revolving circle with the loop formation and knitting action being achieved by ancillary elements moving yarn and loops along the needle stems producing a fabric tube with the technical face facing backwards. Large diameter circular knitting machines are generally used to produce either fleece or jersey fabrics as well as other fabric constructions. The following discussion is taken generally from Spencer, David J., Knitting Technology, (2d. ed. 1989), which is a general treatment of knitting technology and is hereby incorporated by reference in its entirety.

Knitted fabrics are progressively built up by converting newly fed yarn into new loops in the needle hooks, the needles then draw these new loops head first through the old loops, which have been retained from the previous knitting cycle. The needles at the same time release, cast off or knock-over old loops so that they hang suspended by their heads from the feet of the new loops whose heads are still held in the hooks of the needles. A cohesive structure is thus produced by a combination of the intermeshed loops and the yarn joining those loops together through which it passes.

Knitted loops are arranged in rows and columns roughly equivalent to the warp and weft of woven structures termed "courses" and "wales" respectively. A course is a predominately horizontal row of loops (in an upright fabric) produced by adjacent needles during the same knitting cycle. A wale is a predominantly vertical column of needle loops produced by the same needle knitting at successive knitting cycles and thus intermeshing each new loop through the previous loop.

"Yarn count" indicates the linear density (yarn diameter or fineness) to which that particular yarn has been spun. The choice of yarn count is restricted by the type of knitting machine employed and the knitting construction. The yarn count, in turn, influences the cost, weight, opacity, hand and drape of the resulting knitted structure. In general, staple spun yarns tend to be comparatively more expensive the finer their count, because finer fibers and a more exacting spinning process are necessary in order to prevent the yarn from showing an irregular appearance.

The conventional technique for painting or decorating fabrics, such as Tee shirts, is screen-printing. In a typical screen printing operation, a separate screen is made for each color to be applied. A first screen is brought into registry with the fabric surface and a first color painted thereon. A second, third, and fourth screen, if necessary, each representing different colors, is then brought into registry with the surface and the additional colors painted or brushed thereon through the pattern in the screen.

In the textile industry, the problems associated with screen printing have been overcome, to some extent, by a process known as "heat-transfer printing" in which a carrier consisting usually of paper or aluminum foil is printed with sublimable dyes temporarily affixed to the carrier by the use of binders. The carrier so printed is then laid with the printed side adjacent the fabric to be printed, and is then heated under pressure to a temperature in the range of 160° C. to 220° C. on the unprinted side of the carrier to sublime the dyes onto the fabric.

Heat-transfer printing techniques have been attempted onto a wide variety of sheet-like articles such as wood, metals, glass, ceramics, and certain synthetic resins by providing such articles with a surface layer or coating of a thermoplastic resin which adheres to the surface of the substrate and accepts the sublimable dyes. See e.g., German patent No. DE 2,642,350; French Pat. No. 2,230,794; and British Pat. No. 1,517,832. Similarly the surface of the article to be printed may be coated with a thermosetting resin (published European patent application No. 14,901) which receives the dyes. Characteristic of all of the above approaches is that the transfer of the dyes by sublimation onto a thermosetting or thermoplastic resin is effected by means of heat supplied or generated by an external source.

Natural fibers, such as cotton and rayon, do not readily accept or retain sublimable dyes. Because of this shortcoming, polyester/cotton blends dyed in this way exhibit "grin through" since the cotton portion of the fabric remains undyed. In addition, polyester/cotton blends are notorious for "pilling" which further degrades the printed image after a few home washings. While it is generally believed that pilling only occurs with polyester/cotton blends, pilling will also occur in knitted 100% polyester fabrics if staple yarns are used. However, this is not usually observed since polyester staple fibers are seldom used without first being blended with cotton fibers because 100% polyester fabric is uncomfortable to wear against the skin. Consequently, most 100% polyester fabrics that are used for apparel are usually either knitted or woven continuous multi-filament yarns because of the high strength and low cost of these yarns.

Woven 100% synthetic fabric is an ideal substrate for receiving sublimable dyes because of the composition of the yarn and the stability of a woven construction. Unfortunately, the hand, drape, opacity and comfort of a woven 100% polyester fabric are even more unacceptable to the average consumer than the poor appearance of "grin through". As a result, 100% polyester sublimable dyed woven fabrics are usually reserved for banners and other non-apparel uses.

Thus, there remains a need for a new and improved fabric that is print receptive to sublimable dyes like a 100% synthetic fabric and pill-resistant like a continuous multi-filament synthetic fabric while, at the same time, provides the comfort and appearance of a knitted cotton or cotton/polyester stable blend which is suitable for apparel articles, such as Tee shirts.

SUMMARY OF THE INVENTION

The present invention is directed to a print-receptive, pill-resistant, knitted fabric. The fabric is knitted from yarn formed from high-tenacity, staple synthetic fiber having a tenacity value of greater than about 4 grams/denier and preferably about 6 grams/denier. Surprisingly, the resulting knitted fabric has a pilling resistance value of greater than about 3. In the preferred embodiment, the high-tenacity, staple synthetic fiber is selected from the group consisting of air jet spun polyester; nylon; acrylic; and polypropylene. The use of staple fibers improves the hand, drape and comfort of the knitted fabric. Also, in the preferred embodiment, the knitted fabric is a double-knit fabric having a front side and a back side, the front side being formed from the high-tenacity, staple synthetic fiber and the back side being substantially formed from cellulosic yarns, such as cotton and rayon. This construction improves both comfort and opacity of the knitted fabric while, at the same time, provides a print-receptive, pill-resistance face.

Accordingly, one aspect of the present invention is to provide a print-receptive, pill-resistant, knitted fabric. The fabric is knitted from yarn formed from high-tenacity, staple synthetic fiber having a tenacity value of greater than about 4 grams/denier, wherein the knitted fabric has a pilling resistance value of greater than about 3.

Another aspect of the present invention is to provide a print-receptive, pill-resistant, knitted fabric. The fabric is knitted from yarn formed from high-tenacity, staple synthetic fiber having a tenacity value of greater than about 4 grams/denier, wherein the knitted fabric has a pilling resistance value of greater than about 3, and the high-tenacity, staple synthetic fiber is selected from the group consisting of air jet spun polyester; nylon; acrylic; and polypropylene.

Still another aspect of the present invention is to provide a print-receptive, pill-resistant, knitted fabric. The fabric is knitted from yarn formed from high-tenacity, staple synthetic fiber having a tenacity value of greater than about 4 grams/denier, wherein the knitted fabric has a pilling resistance value of greater than about 3, and the high-tenacity, staple synthetic fiber is selected from the group consisting of air jet spun polyester; nylon; acrylic; and polypropylene, and wherein the knitted fabric is a double-knit fabric having a front side and a back side, the front side being substantially formed from the high-tenacity, staple synthetic yarn and the back side being substantially formed from the cellulosic yarn, the cellulosic yarn being selected from the group consisting of cotton and rayon fibers.

*Although pill-resistance is discussed above with reference to a numerical value, pill-resistance is neither defined nor limited by or to a particular value.*

DESCRIPTION OF THE PREFERRED EMBODIMENTS

Figure 1:
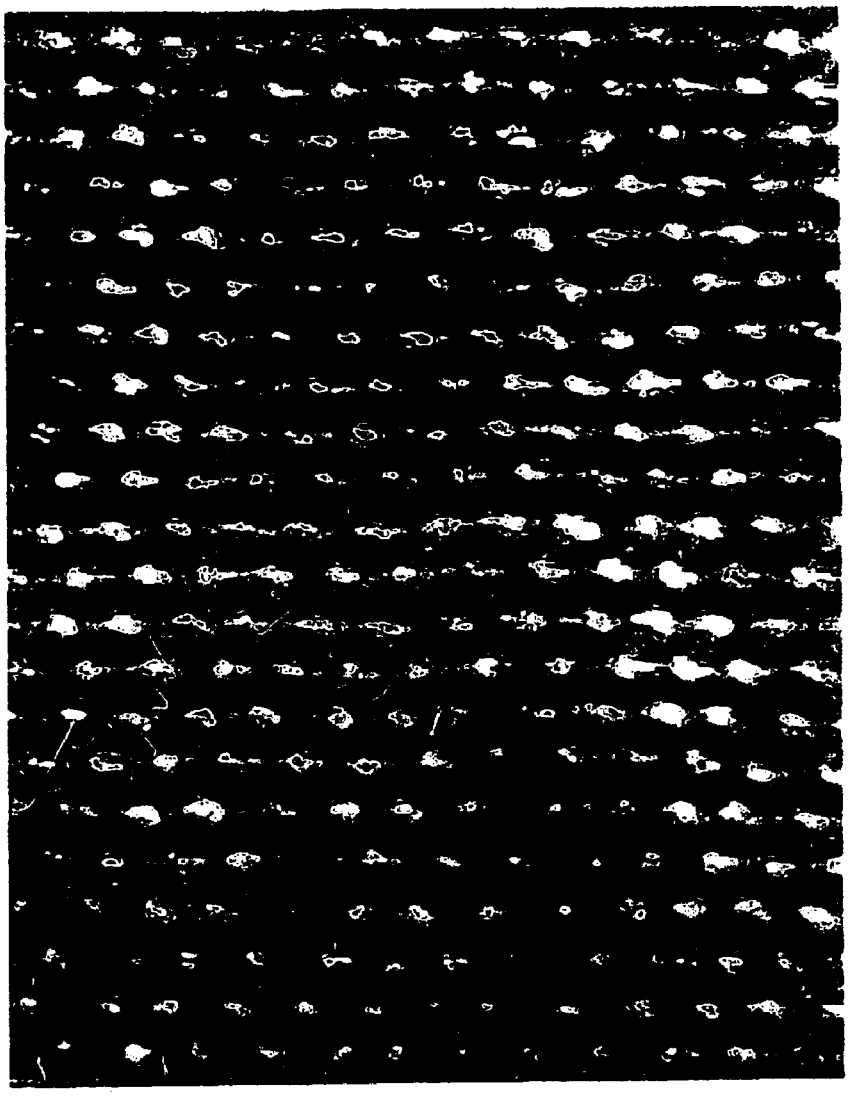
Figure 1 Prior Art
FIG. 1 is a photomicrograph of a conventional jersey cotton knitted fabric, normally used for Tee shirts, illustrating its construction and opacity.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

The present invention can be practiced using a conventional or a convertible circular knitting machine, such as set forth in the U.S. Pat. No. 5,613,375, which is hereby incorporated by reference in its entirety. The knitting machine includes four major sub-assemblies: a creel having a plurality of yarn packages; a plurality of feeders; a knitting cylinder supported on a bed and having a plurality of needles; and a plurality of section blocks attached to the bed and arranged about the perimeter of the cylinder.

Jersey fabric is usually knit on four feeds per block. Only one yarn is necessary to knit a course of jersey fabric. Accordingly, one cam and one yarn will knit one course of jersey fabric. Three cams in each block would make three courses of jersey fabric. Three times 36 jersey section blocks would make 108 courses per cylinder revolution. The more cams around the circumference, the more production. An example of such a fabric is shown in FIG. 1.

Figure 2:
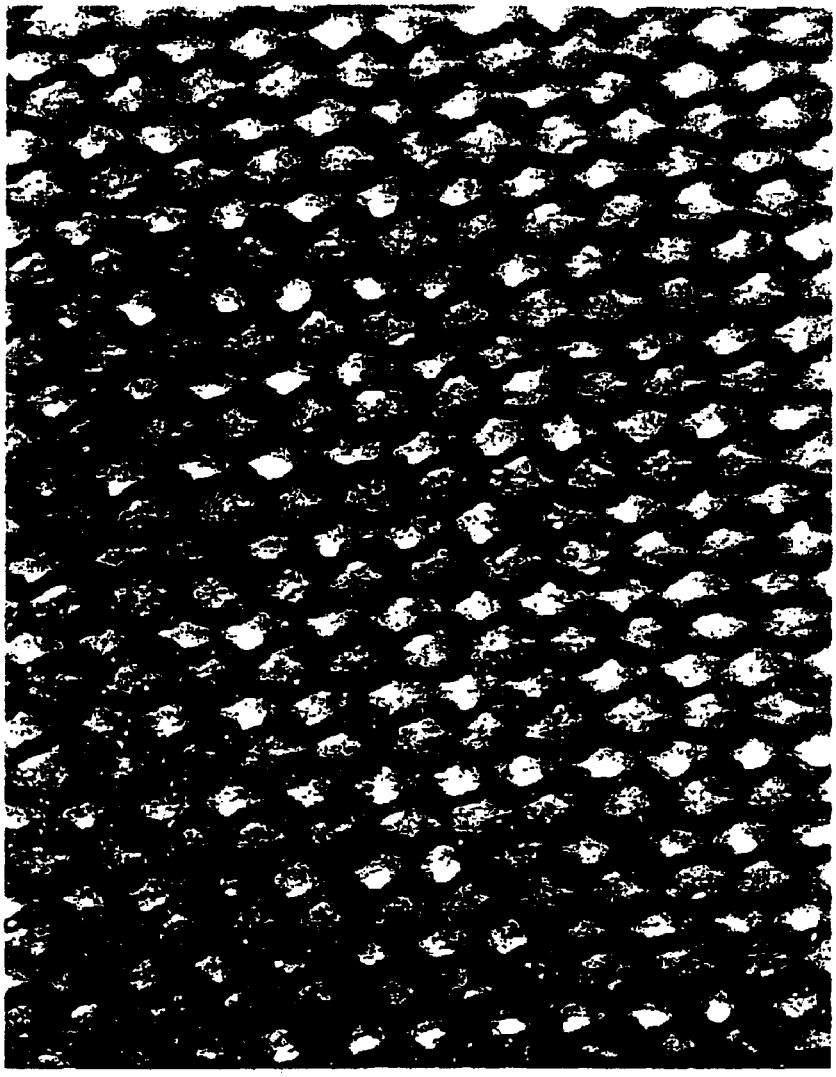
FIG. 2 is a photomicrograph of a double knit fabric, constructed according to the present invention, illustrating its construction and similar opacity.
Figure 3:
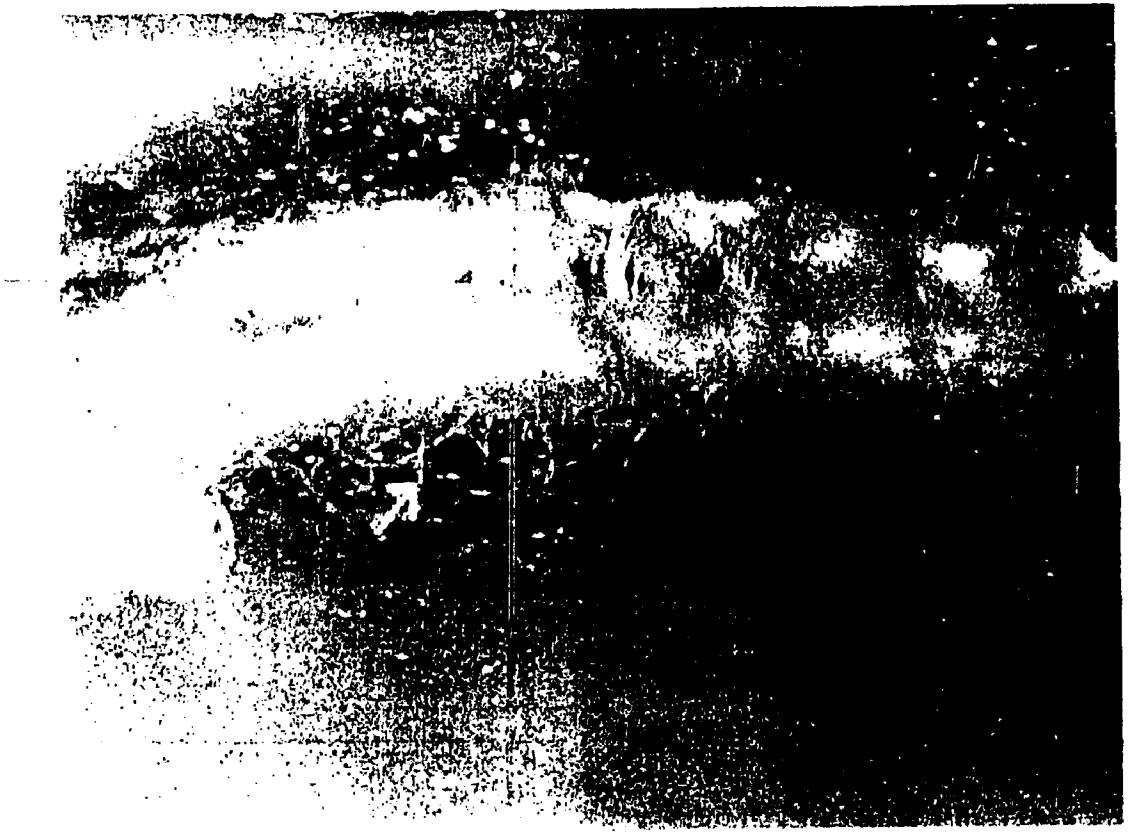
FIG. 3 is a cross-sectional view of the double knit fabric shown in FIG. 2.

According to the present invention, fabrics were formed from a variety of yarns into a double knitted fabric. The face of each fabric was a synthetic yarn, such as polyester, nylon, acrylic or polypropylene. The back of each fabric was a cellulosic fiber, such a cotton. An example of this fabric is shown in FIG. 2. A cross-sectional view of the double knit fabric shown in FIG. 2 is shown in FIG. 3.

The knitted construction of the present invention was generally conventional and was knitted on an eight lock double knit machine have a two track cylinder and a two track dial. This arrangement provides the versatility to knit, tuck and float on all feeds. In the most preferred embodiment, the knitting machine was set up such that the fabric layer knit on the cylinder was either 100% synthetic yarn or 100% cellulosic (e.g. cotton and other natural plant fibers, rayon, acetate and triacetate) and the fabric layer on the dial being the opposite yarn. The resulting fabric was an outer layer of print receptive synthetic yarn and an inner layer of cellulosic yarn. As can be appreciated, the cellulosic yarn layer could be 100% cotton or a blend of cotton/polyester.

After formation, each fabric sample was printed with a sublimable dye and tested for print resolution before and after a 15 home wash and dry laundering was test using a 1–5 scale with 5 being best. The samples were also evaluated for hand, drape, opacity and comfort on a similar scale. Finally, each sample was tested for pilling resistance using the Random Tumble Pilling test procedure. The results can best be understood by referring to Table 1 below:

TABLE 1

| Fabric Construction | Print Resolution (before & after 15 washings) | | Hand | Drape | Opacity | Comfort | Pilling Resistance* (with & wo cotton fibers) | |
|---|---|---|---|---|---|---|---|---|
| 100% ring spun polyester (Example 1) | 5 | 3.5 | 1 | 1 | 1 | 1 | 2.5 | — |
| 100% polyester Comfortrel ® (Example 2) | 5 | 3 | 4 | 1 | 2 | 3 | 2 | — |
| Plating poly to face and cotton to back (Example 3) | 3 (grin thru) | 2 | 4 | 4 | 4 | 3 | 2.5 | — |
| Double-knit with ploy to face and cotton to back (Example 4) | 5 | 3.5 | 3 | 4 | 4+ | 4– | 2.5 | 2 |
| Double-knit w/ Comfortrel ® to face and cotton to back (Example 5) | 5 | 3.5 | 4 | 4 | 4+ | 4+ | 2.5 | 3 |

TABLE 1-continued

| Fabric Construction | Print Resolution (before & after 15 washings) | | Hand | Drape | Opa-city | Com-fort | Pilling Resistance* (with & wo cotton fibers) | |
|---|---|---|---|---|---|---|---|---|
| Double-knit with high tenacity, air jet spun polyester yarn to face and cotton to back (Example 6) | 5 | 5 | 4 | 4 | 4+ | 4+ | 3.0 | 4 |

*pilling resistance was tested according to ASTM D3512-82 test method both with and without the introduction of cotton fibers into the test chamber.

As can be seen, 100% polyester had good print resolution after washing but poor hand, drape, opacity and comfort. Surprisingly, its pilling resistance was only average. Substituting Comfortrel®, variable staple length fibers improved hand, opacity and comfort but, surprisingly, did not help drape or pilling resistance.

As can also be seen, plating the polyester with cotton did improve hand, drape, opacity and comfort but "grin through" and pilling resistance were only average. In addition, the plating process was hard to control and, as a result, the placement of the yarns varied.

To the contrary, the double knitted fabric of the present invention (examples 4–6) produced very good print resolution after washing with high hand, drape, opacity and comfort values. In addition, the use of Comfortrel® fibers (example 5) further improved the hand but, surprisingly, did not improve the pilling resistance of the polyester face.

However, surprisingly, the use of higher tenacity yarns (example 6) substantially eliminated that shortcoming while, at the same time, maintained the other critical values of print resolution after washing, hand, drape, opacity and comfort. The original Comfortrel® fibers had a tenacity of about 3 grams/denier. The higher tenacity yarns (example 6) had a tenacity of about 6 grams/denier and, unexpectedly, did not pill. This is contrary to the generally excepted idea of reducing the tenacity of the synthetic yarns when pilling occurs to allow the pills to more easily break off.

In the most preferred embodiment, shown in example 6, the high-tenacity, staple synthetic fiber is polyester having a denier of less than about 1.5 and preferably about 1. Also, the staple length of this high-tenacity, synthetic fiber was about 1.5 inches but variable lengths up to about 1.5 inches would be expected to work as well. The above data illustrates that a knitted fabric constructed according to the present invention is print receptive and pill resistant, thereby providing excellent print resolution even after 15 home washings.

An article of apparel formed from the fabric of the present invention may be printed using, for example, a Sawgrass Sublijet ink system in an Epson 3000 ink jet printer and transferring the image to the polyester print receptive surface. Preferably, the image is composed using conventional desktop publishing software, such as Hanes T-ShirtMaker, and printed on high-quality ink jet transfer paper, such as "ColorTrans" paper from Wyndstone. The actual transfer to the apparel may be done using an Insta-Graphic heat press set at about 400 degrees F and pressing for about 20 seconds.

Certain modifications and improvements will occur to those skilled in the art upon a reading of the foregoing description. By way of example, the substantially 100% cellulosic layer could be altered to include a blend of natural and synthetic fibers for particular applications and markets. Similarly, the substantially 100% polyester layer could be altered to include other synthetic fibers for particular applications and markets. Also, finishes may be applied to the fabric either during knitting or afterwards to further improve desirable fabric characteristics, such as shown in Table 1. It should be understood that all such modifications and improvements have been deleted herein for the sake of conciseness and readability but are properly within the scope of the following claims.

What is claimed is:

1. A print-receptive, pill-resistant, knitted fabric, said fabric knitted from yarn formed from high-tenacity, staple synthetic fiber having a tenacity value of greater than about 4 grams/denier, wherein said knitted fabric has a pilling resistance value of greater than about 3 and wherein said knitted fabric is a double-knit fabric having a front side and a back side, the front side being formed from said high-tenacity, staple synthetic fiber and the back side being substantially formed cellulosic yarn, said cellulosic yarn being selected from the group consisting of cotton and synthetic cellulosic fibers.

2. The knitted fabric of claim 1, wherein the back side of said fabric is substantially 100% spun cotton fiber.

3. The knitted fabric of claim 1, wherein the front side and back side of said fabric are a single jersey knit construction.

4. The knitted fabric of claim 1, further including a tie yarn between the front and back of said fabric.

5. The knitted fabric of claim 1, wherein the high-tenacity, staple synthetic fiber has a tenacity of about 6 grams/denier.

6. A print-receptive, pill-resistant, knitted fabric, said fabric knitted from yarn formed from high-tenacity, staple synthetic fiber having a tenacity value of greater than about 4 grams/denier, wherein said knitted fabric has a pilling resistance value of greater than about 3, and said high-tenacity, staple synthetic fiber is selected from the group consisting of air jet spun polyester; nylon; acrylic; and polypropylene, and wherein said knitted fabric is a double-knit fabric having a front side and a back side, the front side being formed from said high-tenacity, staple synthetic fiber and the back side being substantially formed from cellulosic yarn, said cellulosic yarn being selected from the group consisting of cotton and synthetic cellulosic fibers.

7. The knitted fabric of claim 6, wherein the back side of said fabric is substantially 100% spun cotton fiber.

8. The knitted fabric of claim 6, wherein the front side and back side of said fabric are a single jersey knit construction.

9. The knitted fabric of claim 6, further including a tie yarn between the front and back of said fabric.

10. The knitted fabric of claim 6, wherein the high-tenacity, staple synthetic fiber has a tenacity of about 6 grams/denier.

11. The knitted fabric of claim 6, wherein said high-tenacity, staple synthetic fiber is polyester.

12. The knitted fabric of claim 6, wherein said high-tenacity, staple synthetic fiber has a denier of less than about 1.5.

13. The knitted fabric of claim 12, wherein said high-tenacity, staple synthetic fiber has a denier of about 1.

14. The knitted fabric of claim 6, wherein the staple length of said high-tenacity, synthetic fiber is about 1.5 inches.

15. The knitted fabric of claim 14, wherein the staple length of said high-tenacity, synthetic fiber is variable up to about 1.5 inches.

16. A printed, pill-resistant, article of apparel, said article of apparel knitted from yarn formed from high-tenacity, staple synthetic fiber having a tenacity value of greater than about 4 grams/denier, wherein said article of apparel has a pilling resistance value of greater than about 3 and wherein said knitted fabric is a double-knit fabric having a front side and a back being substantially formed from cellulosic yarn, said cellulosic yarn being selected from the group consisting of cotton and cellulosic fibers.

17. A printed, pill-resistant, article of apparel, said article of apparel knitted from yarn formed from high-tenacity, staple synthetic fiber having a tenacity value of greater than about 4 grams/denier, wherein said article of apparel has a pilling resistance value of greater than about 3, and said high-tenacity, staple synthetic fiber is selected from the group consisting of air jet spun polyester; nylon; acrylic; and polypropylene, and wherein said article of apparel is formed from a double-knit fabric having a front side and a back side, the front side being formed from said high-tenacity, staple synthetic fiber and the back side being substantially formed from cellulosic yarn, said cellulosic yarn being selected from the group consisting of cotton and synthetic cellulosic fibers.

*18. A print-receptive, pill-resistant, knitted fabric, said fabric knitted from yarn formed from high-tenacity, staple synthetic fiber having a tenacity value of greater than about 4 grams/denier, wherein said knitted fabric is a double-knit fabric having a front side and a back side, the front side being formed from said high-tenacity, staple synthetic fiber and the back side being substantially formed from cellulosic yarn, said cellulosic yarn being selected from the group consisting of cotton and synthetic cellulosic fibers.*

*19. The knitted fabric of claim 18, wherein the back side of said fabric is substantially 100% spun cotton fiber.*

*20. The knitted fabric of claim 18, wherein the front side and back side of said fabric are a single jersey knit construction.*

*21. The knitted fabric of claim 18, further including a tie yarn between the front and back of said fabric.*

*22. The knitted fabric of claim 18, wherein the high-tenacity, staple synthetic fabric has a tenacity of about 6 grams/denier.*

*23. A print-receptive, pill-resistant, knitted fabric, said fabric knitted from yarn formed from high-tenacity, staple synthetic fiber having a tenacity value of greater than about 4 grams/denier, and wherein said high-tenacity, staple synthetic fiber is air jet spun, and wherein said knitted fabric is a double-knit fabric having a front side and a back side, the front side being formed from said high-tenacity, staple synthetic fiber and the back side being substantially formed from cellulosic yarn, said cellulosic yarn being selected from the group consisting of cotton and synthetic cellulosic fibers.*

*24. The knitted fabric of claim 23, wherein the air jet spun, high-tenacity, staple synthetic fiber is polyester.*

*25. The knitted fabric of claim 23, wherein the back side of said fabric is substantially 100% spun cotton fiber.*

*26. The knitted fabric of claim 23, wherein the front side and back side of said fabric are a single jersey knit construction.*

*27. The knitted fabric of claim 23, further including a tie yarn between the front and back of said fabric.*

*28. Thek knitted fabric of claim 23, wherein the high-tenacity, staple synthetic fabric has a tenacity of about 6 grams/denier.*

* * * * *